SELF-SUPPORTING CENTER SPINDLE FOR PHONOGRAPH RECORD CHANGERS

Filed July 15, 1963

INVENTOR.
Gerald H. Freier
BY
Brown, Jackson, Boettcher & Dienner
Attys.

INVENTOR
Gerald H. Freier
BY
Brown, Jackson, Boettcher + Dienner
Att'ys

Aug. 9, 1966 G. H. FREIER 3,265,393

SELF-SUPPORTING CENTER SPINDLE FOR PHONOGRAPH RECORD CHANGERS

Filed July 15, 1963

5 Sheets-Sheet 3

INVENTOR.
Gerald H. Freier
BY
Brown, Jackson, Boettcher & Dienner
Attys.

SELF-SUPPORTING CENTER SPINDLE FOR PHONOGRAPH RECORD CHANGERS

Filed July 15, 1963

INVENTOR.
Gerald H. Freier
BY
Brown, Jackson, Boettcher & Dienner
Att'ys.

SELF-SUPPORTING CENTER SPINDLE FOR PHONOGRAPH RECORD CHANGERS

Filed July 15, 1963

INVENTOR.
Gerald H. Freier
BY
Brown, Jackson, Boettcher & Dienner
Att'ys.

3,265,393

SELF-SUPPORTING CENTER SPINDLE FOR PHONOGRAPH RECORD CHANGERS

Gerald H. Freier, Benton Harbor, Mich., assignor to V-M Corporation, Benton Harbor, Mich., a corporation of Michigan Filed July 15, 1963, Ser. No. 295,087
19 Claims. (Cl. 274—10)

The present invention relates to a self-supporting record changer spindle of the type having a plurality of record supporting fingers adapted to project radially outwardly through openings in a spindle body member for supporting a stack of records thereon without need for additional stabilizing means for the records.

Self-supporting spindles are known in the art and possess the advantage that they eliminate the need for the usual record stabilizer arm which is disposed on the top of a stack of records mounted on a spindle for stabilizing the same. However, self-supporting spindles as heretofore known are subject to various disadvantages with respect to both mode of manufacture and operation. One of the principal disadvantages relates to the problem of manufacturing a spindle body having a plurality of slots or openings therein through which the retractable supporting fingers may project. It is common to provide a plurality of circumferentially spaced supporting fingers carried by an actuator rod or the like which is axially movable within a spindle body, and openings generally in the form of vertical slots are formed in the spindle body to permit the fingers to extend outwardly therethrough into operative record supporting positions and to be retracted into the spindle body to drop a record to the turntable.

Spindle bodies having the requisite circumferentially spaced vertical slots formed therein have heretofore commonly been manufactured by one of two methods. In accordance with one known method of manufacture the slots are pierced or milled one at a time into a piece of tubing, and in such instances the formation of each slot requires individual location of the tube. After milling or piercing, burrs must be removed from each of the slots by centerless grinding or hand scraping. In accordance with a somewhat simplified alternative known mode of manufacture, the vertical slots may be formed in a flat piece of metal by a stamping operation, and the flat piece may then be rolled into tubular form. In the latter instance the seam requires butt welding, after which the tube must be ground to a circular shape to remove all bumps and weld marks. Each of the foregoing known methods of manufacture requires considerable individual handling of the part being manufactured, and the total machine time required is rather substantial.

It is an object of the present invention to provide an improved spindle body for self-supporting spindle which body comprises an extruded tubular member having a plurality of internal ribs or fins which permit formation of the requisite vertical slots by means of a simple turning operation such as on a multiple spindle screw machine or an automatic lathe.

Another object of the invention is to provide a method of manufacturing a spindle body for a self-supporting spindle which method substantially reduces manufacturing time and costs and provides an improved spindle structure.

In furtherance of the foregoing object I provide a spindle body which is manufactured from an extruded tube having a plurality of internal longitudinal ribs or fins which are connected by a relatively thin tubing wall and which serve to space or cage the several record supporting fingers of the spindle. If it is desired that the self-supporting spindle comprise six supporting fingers, then I provide extruded tubing with six internal circumferentially spaced ribs spaced apart slightly greater than the width of the supporting fingers so as to be adapted to accommodate the fingers therebetween. The tube wall between the ribs is relatively thin so that by simply performing a turning operation on a predetermined portion of the length of the extruded tube it is possible to remove a section of the thin external wall and thereby expose the openings between the rib members which openings in effect form the slots for the supporting fingers.

The internal ribs define the slots and act as locating and holding means for the fingers so as to eliminate any necessity for providing additional means to control the spacing of the fingers. Thus, the method of manufacture comprises merely extruding the thin-walled tubing to form the desired number of internal ribs therein, and then performing a simple turning operation such as on a multiple spindle screw machine or an automatic lathe to remove a predetermined length of the thin external wall and thus expose the openings between the rib members. It will of course be understood that while a section of the thin external wall is removed, the rib members remain to provide a single integral spindle body. The foregoing structure provides significant operational advantages, and the method of manufacture effects a substantial reduction in manufacturing time and expense.

A further object of the invention is to provide improved means for expanding the supporting fingers radially outwardly into their operative record supporting positions.

An additional one of my objects is to provide improved means for stopping a record which has been released by the supporting fingers and supporting the record in an intermediate vertical position to permit sensing the size thereof before dropping the same to the turntable for playing.

Another object of the invention is to provide improved secondary record supporting means for supporting all but the lowermost one of a stack of records when the primary supporting fingers are retracted to drop the bottom record to the turntable.

A still further object of the invention is to provide a self-supporting spindle having means for maintaining the record supporting fingers in their retracted inoperative positions when it is desired to manually lower a record to the turntable.

These and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

In the drawings:

FIGURE 1 is a vertical sectional view, partly broken away and taken substantially along the line 1—1 of FIGURE 8, showing a self-supporting record changer spindle constructed in accordance with the present invention, the record supporting fingers being shown in solid lines in their operative record supporting positions and in dash lines as retracted to permit manual lowering of records to the turntable;

Figure 12:
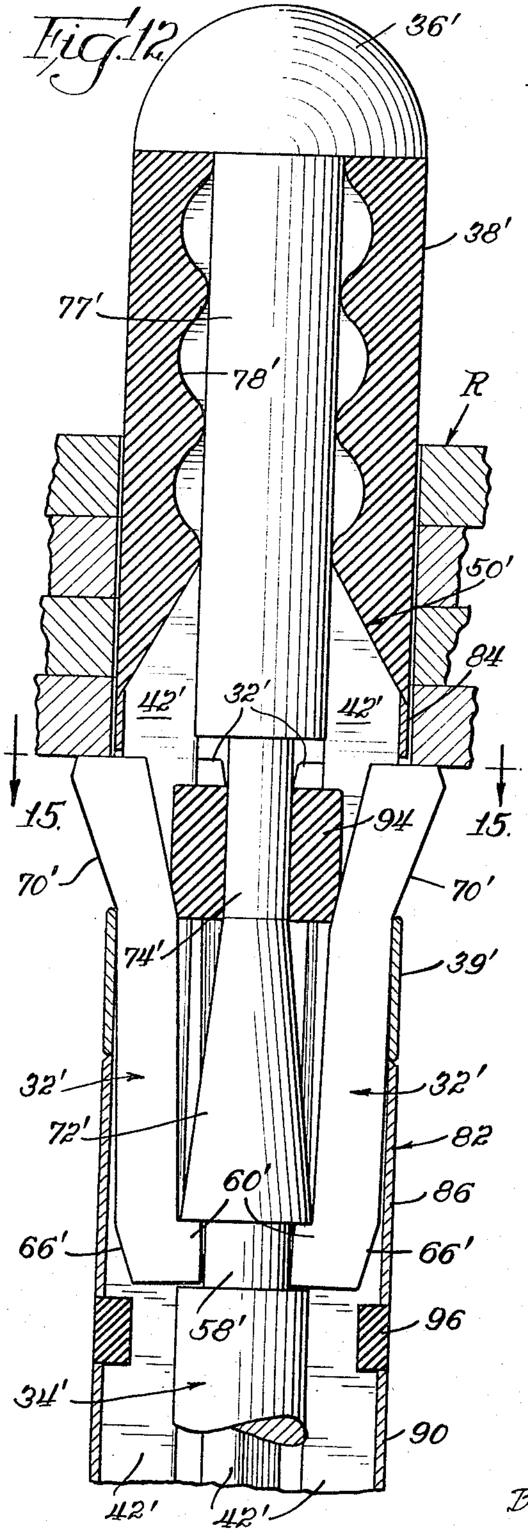
FIGURE 12 is a vertical sectional view, partly broken away and taken substantially along the line 12—12 of FIGURE 15, showing a self-supporting record changer spindle constructed in accordance with an alternative embodiment of the present invention, the primary supporting fingers being shown in their operative record supporting positions.
Figure 13:
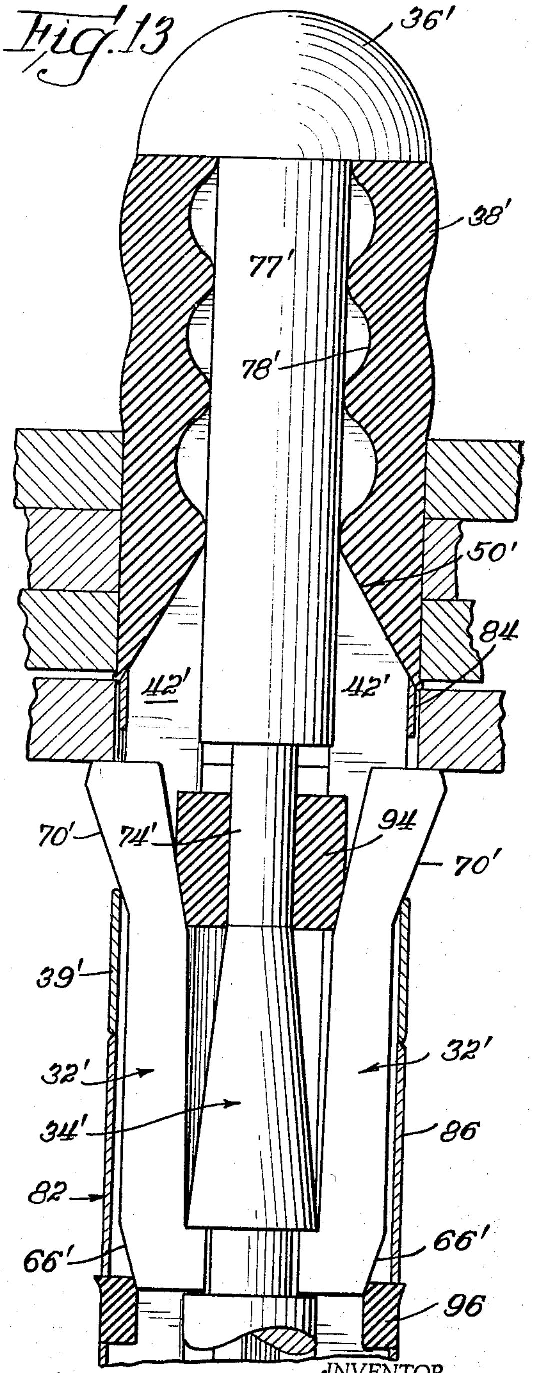
FIGURE 13 is a view similar to FIGURE 12 showing the actuator rod lowered somewhat from the position of FIGURE 12 to effect expansion of the secondary record supporting sleeve and partial retraction of the primary supporting fingers.
Figure 14:
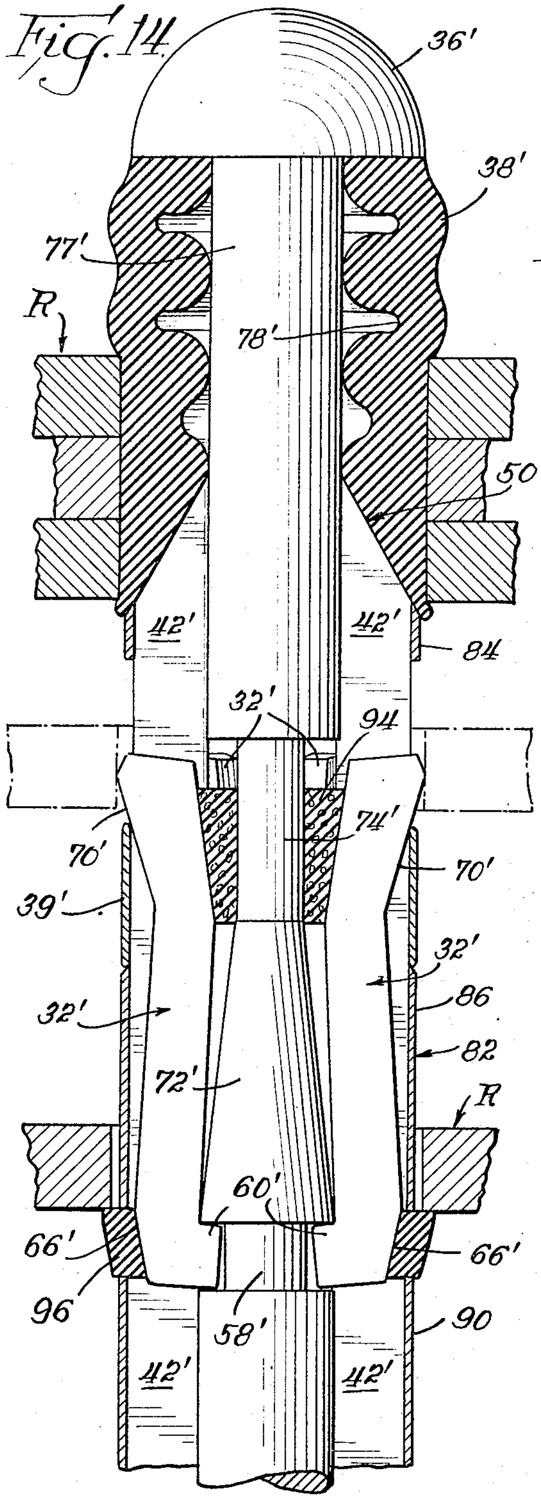
Figure 18:
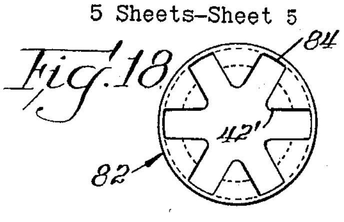
Figure 16:
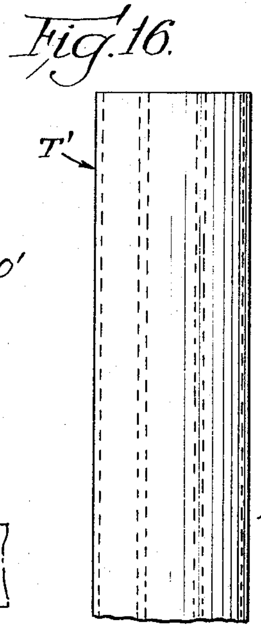
Figure 17:
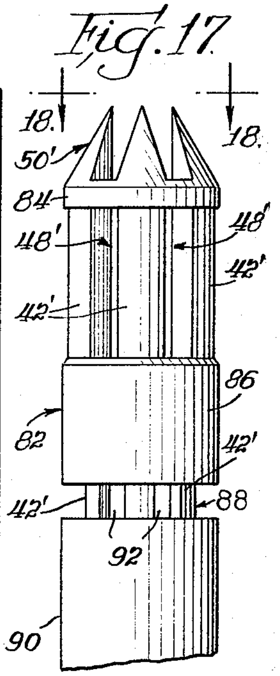
Figure 15:
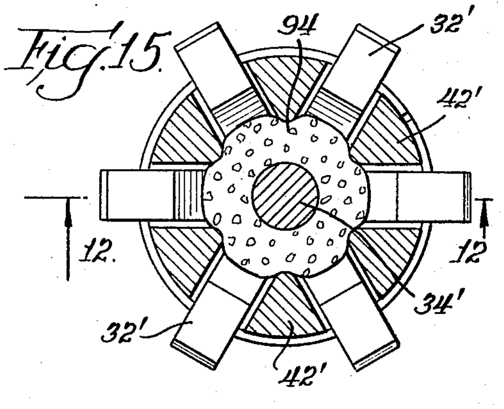

FIGURE 14 is another view similar to FIGURE 12 showing the actuator rod in its lowermost position so as to retract the record supporting fingers sufficiently to permit the bottom record of a stack to be released, there being shown an alternative form or record stopping means for stopping a record thus released and supporting the same in an intermediate position to permit sensing the size thereof before dropping the same to the turntable for playing;

FIGURE 15 is a transverse section taken substantially along the line 15—15 of FIGURE 12;

FIGURE 16 is an elevational view of an extruded tube used for manufacture of the spindle body member of the self-supporting spindle of FIGURES 12–14;

FIGURE 17 is an elevational view showing the extruded tube of FIGURE 16 after a turning operation has been performed on certain sections thereof to expose the openings between the internal rib members; and FIGURE 18 is a top plan view looking substantially in the direction of the arrows 18—18 of FIGURE 17.

Figure 1:
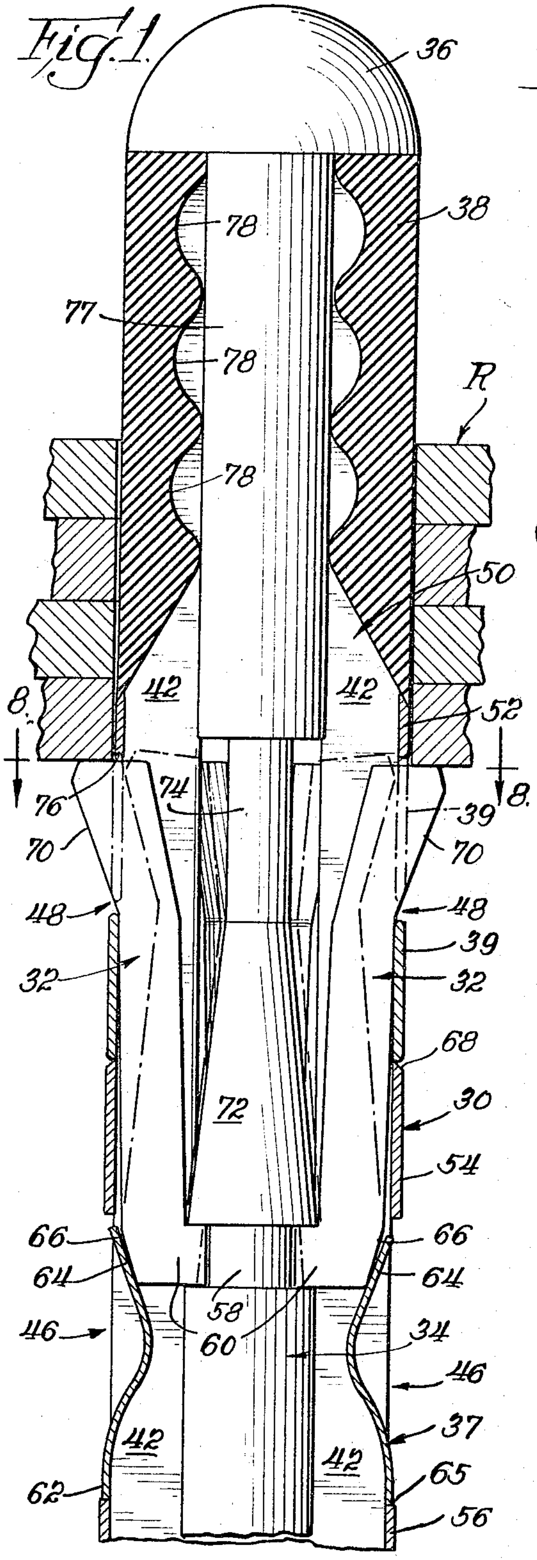
Figure 2:
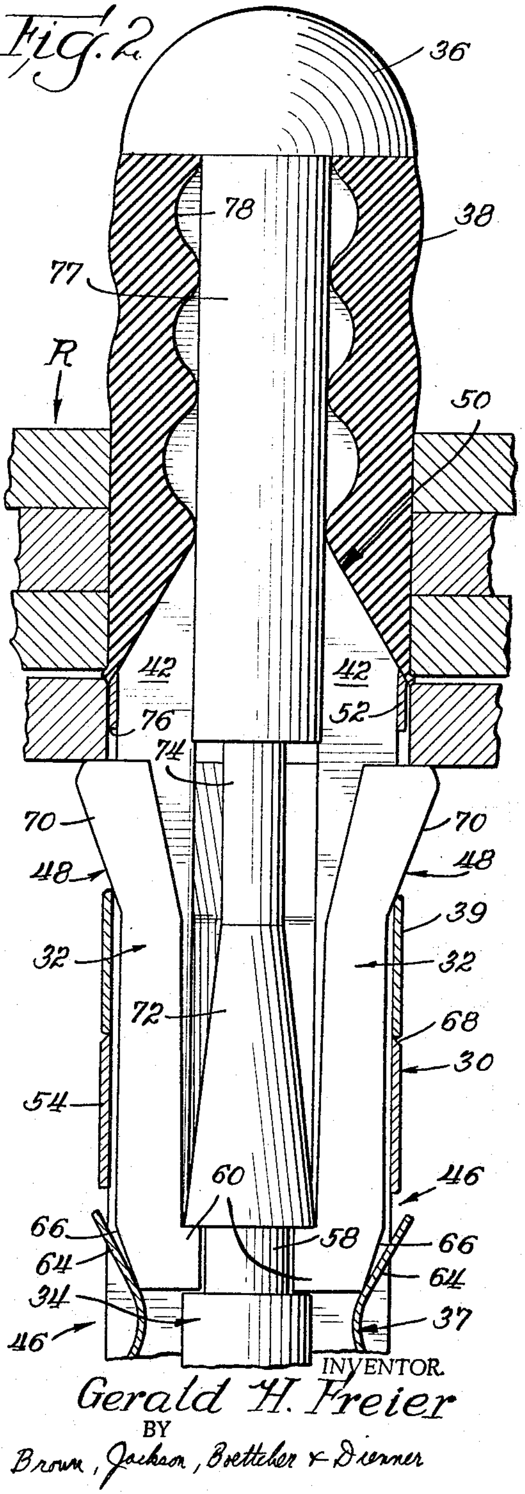
FIGURE 2 is a view similar to FIGURE 1 showing an actuator rod lowered somewhat from the position of FIGURE 1 to effect expansion of the secondary record supporting sleeve and partial retraction of the primary record supporting fingers.
Figure 3:
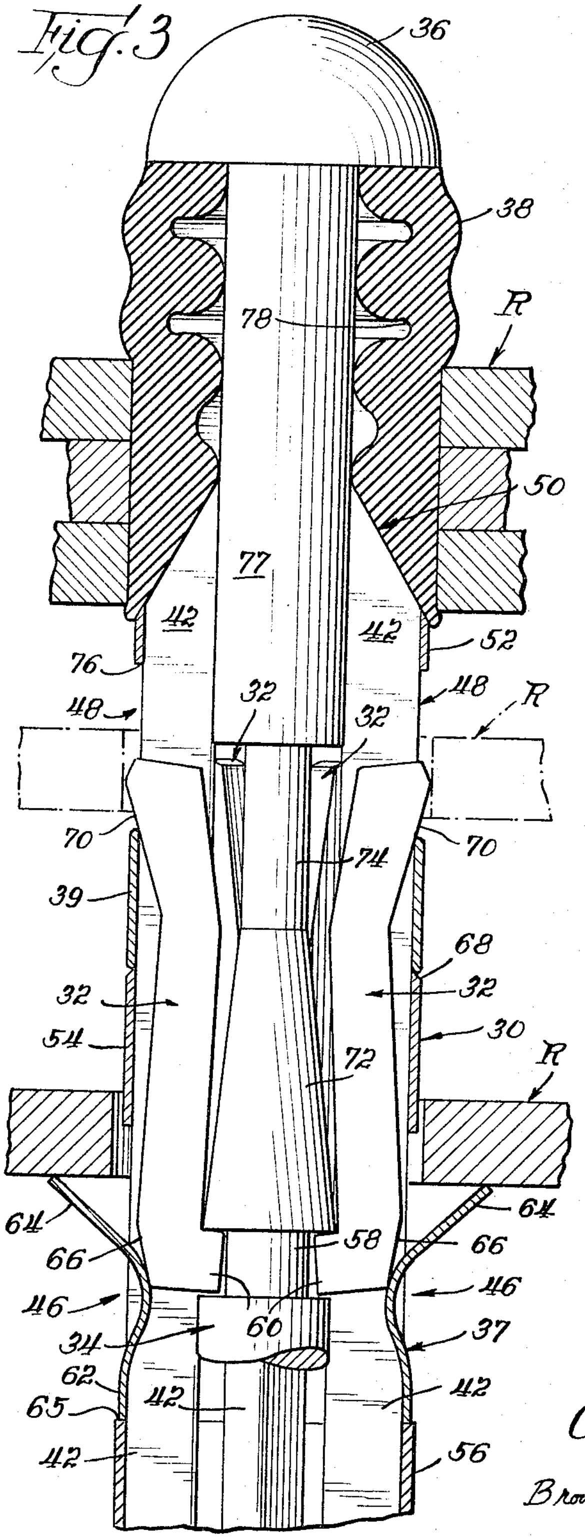
FIGURE 3 is another view similar to FIGURE 1 showing the actuator rod in its lowermost position so as to retract the record supporting fingers sufficiently to permit the bottom record of a stack to be released, there being shown record stopping means for supporting the released record in an intermediate position to permit size-sensing before dropping the same to the turntable for playing.

Referring now to the drawings, FIGURES 1–3 show a self-supporting record changer spindle comprising a spindle body indicated generally at 30, and a plurality of primary record supporting fingers 32 which extend radially outwardly through openings formed in the spindle body so as to support a stack of records R which has been positioned over the spindle. An actuator rod 34 is axially slidable within the spindle body 30 and carries a head 36 at its upper end which serves to axially compress a radially expandable rubber sleeve 38 which comprises secondary record supporting means. A record stop ring 37 is mounted on the spindle body 30 beneath the supporting fingers 32 and serves to stop a record which is released from the fingers and to support the record in an intermediate position to permit sensing the size thereof before dropping the same to the turntable. An axially slidable collar 39 is disposed below the projecting upper ends of the fingers 32 for retracting the latter when the actuator rod 34 is pulled downwardly.

Figures 8, 9, 10, 11:
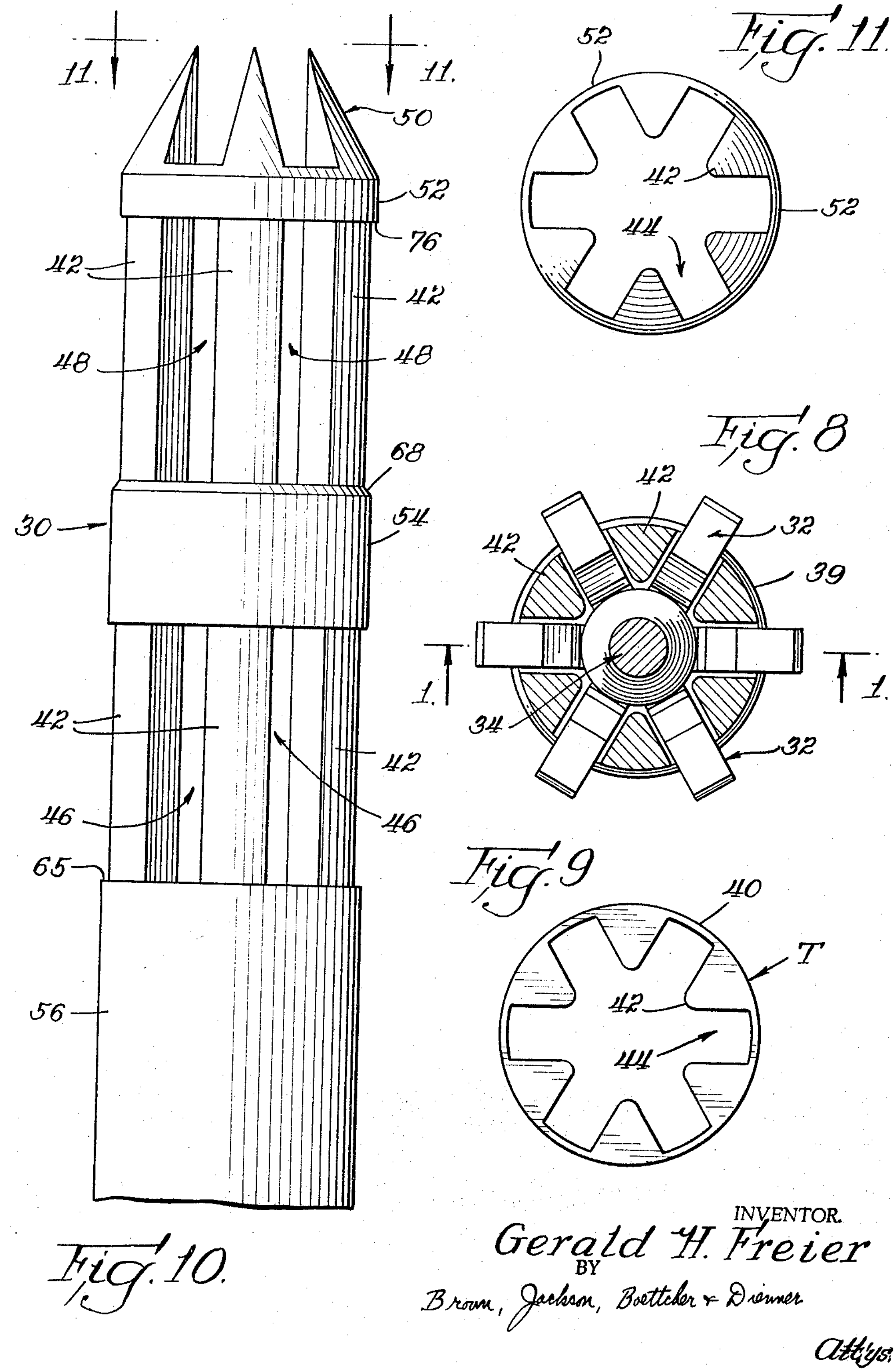
FIGURE 8 is a transverse section taken substantially along the line 8—8 of FIGURE 1 showing the manner in which a plurality of record supporting fingers are caged or spaced between the internal ribs of the spindle body.
FIGURE 9 is an end view of a piece of extruded tubing having a plurality of internal rib members which tubing is used in the manufacture of a spindle body in accordance with the present invention.
FIGURE 10 is an elevational view of a spindle body which comprises one of the components of the self-supporting spindle of FIGURES 1–3, the spindle body being formed by performing a turning operation on a length of extruded tubing of the type shown in FIGURE 9.
FIGURE 11 is a top plan view looking substantially in the directions of the arrows 11—11 of FIGURE 10.

An important feature of the present invention relates to the structure of the spindle body 30, as best shown in FIGURE 10, and to the method of manufacturing such a spindle body from an extruded tube T of the type shown in FIGURE 9. The tube T comprises an extruded aluminum tube formed with a plurality of internal ribs 42 circumferentially spaced around a thin wall or web 40, the radial thickness of the internal ribs 42 being substantially greater than the thickness of the intervening web portions. In the embodiment described in FIGURES 1–3, there are six supporting fingers 32, and thus the tube T is formed with six internal ribs 42. The ribs 42 are circumferentially spaced apart to provide slots 44 therebetween adapted to space or cage corresponding ones of the supporting fingers 32.

In order to manufacture a spindle body such as shown at 30 in FIGURE 10 from extruded aluminum tubing T of the type shown in FIGURE 9 it is simply necessary to perform a turning operation as on a multiple spindle screw machine or an automatic lathe to remove certain sections of the thin external wall 40 and thereby expose the slots or openings 44. Thus, the tubing T is turned to remove a lower section of the wall 40 to expose a plurality of slots or openings 46 in the spindle body to accommodate arms 64 formed on the record stop ring 37, and an upper section of the wall is similarly removed to expose a plurality of slots 48 through which the supporting fingers 32 may project.

In the particuular embodiment shown, the upper end of the spindle body 30 is machined to form a tapered portion 50 which assists in the radial expansion of the rubber sleeve 38 when the actuator rod 34 is pulled downwardly. The spindle body 30 thus comprises an upper wall portion 52 which defines the upper ends of the vertical slots 48, an intermediate wall portion 54 which defines the lower ends of the slots 48 and also the upper ends of the slots 46, and a lower wall portion 56. It will be understood that the upper slots 48 will be required in substantially all applications of the present invention since they accommodate the primary supporting fiingers 32 which are an essential element of the self-supporting spindle, whereas the lower slots 46 and the upper tapered portion 50 may be modified or eliminated in certain applications.

Referring again to FIGURES 1–3, the actuator rod 34 has a peripheral groove 58 formed therein, and each of the fingers 32 includes a radially inwardly projecting extension 60 which is disposed within the groove 58. It is not necessary to fasten the fingers 32 to the actuator rod 34 or to provide an additional cage member or the like in order to maintain the fingers in their proper circumferentially spaced relationship, since when the fingers are retracted as shown in FIGURE 3 (or as shown in dash lines in FIGURE 1 for manual play) they are still disposed in the spaces 44 (see FIGURE 9) formed between the several ribs 42, whereby the ribs serve to space or cage the supporting fingers. The positioning of the finger extensions 60 within the groove 58 will of course cause the fingers to be carried with the actuator 34 when the latter is moved axially within the spindle body.

Figure 6:
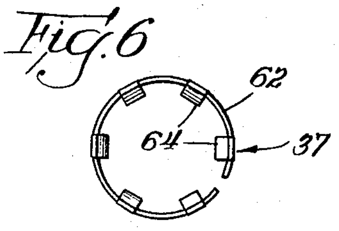
FIGURE 6 is a detail top plan view of a record stop ring for stopping a record which has been released by the primary supporting fingers and supporting the record in an intermediate position to permit sensing the size thereof.
Figure 7:
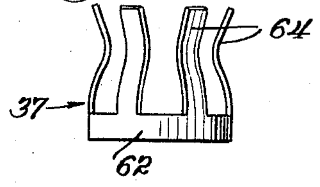
FIGURE 7 is an elevational view of the record stop ring of FIGURE 6.

The record stop ring 37 (see FIGURES 6 and 7) comprises a split ring portion 62 and six supporting arms 64 which are integral with the ring and extend upwardly therefrom. The arms 64 are bent so as to extend first upwardly and somewhat inwardly and then upwardly and outwardly, and the stop ring 37 is disposed around the spindle body 30 immediately above the lower spindle wall portion 56. Accordingly, the split ring 62 encompasses the spindle body 30 at a section where the thin external wall 40 has been removed, and it rests on a ledge 65 formed at the lower ends of the slots 46.

FIGURE 1 shows the supporting arms 64 in their normal positions wherein they are retracted within the spindle wall. Each of the supporting fingers 32 has an inclined cam surface 66 formed at the radially outer portion of the lower end thereof, and the arms 64 are biased inwardly so as to bear against the cam surfaces 66. It will thus be understood that when the actuator rod 34 is in its upper position as shown in FIGURE 1, the upper ends of the arms 64 will be radially retracted. As the rod 34 begins its downward travel as shown in FIGURE 2, the cam surfaces 66 will force the arms 64 outwardly, and when the rod has completed its downward stroke the arms will be in their radially extended operative positions as shown in FIGURE 3 wherein they are adapted to stop and support a record R which has been released by the primary supporting fingers 32. It is important to note that the supporting arms 64 serve a dual function since as they bear against the lower ends of the fingers 32 they bias the latter toward their radially extended positions of FIGURE 1.

Figure 4:
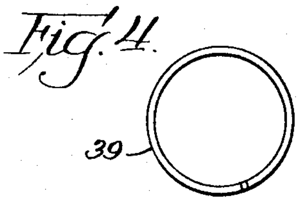
FIGURE 4 is a detail top plan view of a spindle collar which serves to retract the supporting fingers when the actuator rod is moved downwardly, and which is slidable upwardly on the spindle to maintain the supporting fingers in retracted positions for manual operation.
Figure 5:
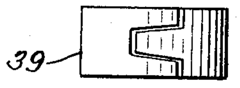
FIGURE 5 is an elevational view of the collar of FIGURE 4.

The spindle collar 39 (see FIGURES 4 and 5) comprises a split steel ring which wraps around the spindle body 30 at a section where the external wall 40 has been removed so as to encompass the several ribs 42 and in its normal position rest upon a ledge 68 formed at the lower ends of the vertical slots 48. The upper ends of the supporting fingers 32 have outwardly extending cam surfaces 70 which bear against the upper annular edge of the collar 39 when the actuator rod 34 is lowered thus causing the fingers to be retracted. When the rod 34 is in its uppermost position as shown in FIGURE 1, the fingers 32 will be disposed in their radially extended positions so as to project outwardly through the slots 48 and thereby be adapted to support a stack of records R, the fingers being biased to their operative positions through engagement at their lower ends by the spring arms 64. When the actuator rod 34 is pulled downwardly the cam surfaces 70 engage the collar 39 causing the fingers to be cammed inwardly to their retracted positions as shown in FIGURE 3, whereby a record R is supported on the fingers will be released and permitted to fall down the spindle until stopped by the supporting arms 64. It will be noted that the actuator rod 34 includes a frusto-conical portion 72 and adjacent thereto a reduced diameter portion 74 so as to provide ample space for the fingers 32 to retract within the spindle wall.

The collar 39 is slidable upwardly on the spindle body 30 from the position shown in solid lines in FIGURE 1 to a raised position shown in dash lines therein. In the raised position of the collar 39 it bears against a ledge 76 (see FIGURE 10) formed at the upper ends of the slots 48. When the collar 39 is manually raised in the manner described it will maintain the supporting fingers 32 in their radially retracted positions, and at the same time the actuator rod 34 may be disposed in its upper position as shown in FIGURE 1 so that the rubber sleeve 38 will be in its free or radially retracted position so as to permit records to be passed thereover. Accordingly, when the spindle components are thus disposed the self-supporting spindle will be adapted for manual use since a record may be manually lowered on the spindle to a turntable (not shown) at the lower end thereof without being impeded by any of the record supporting means.

The rubber sleeve 38 comprises secondary record supporting means for supporting all but the lowermost record in a stack so as to permit the bottom record to be released down the spindle upon retraction of the primary supporting fingers 32. The sleeve 38 is bonded to the underside of the cap 36 and is mounted on an upper end portion 77 of the actuating rod 34, the lower end of the sleeve being supported on the tapered upper end 50 of the spindle body. When the actuator rod 34 is in its upper position as shown in FIGURE 1 the outer surface of the sleeve will be approximately cylindrical and will permit records to be passed downwardly thereover for the purpose of positioning a stack of records on the supporting fingers 32. However, when the actuator rod 34 is moved downwardly to the position of FIGURE 2 the sleeve 38 will be axially compressed and thereby expanded radially so as to grip all but the lowermost record of the stack.

The secondary supporting sleeve 38 is preferably formed with a plurality of internal annual grooves 78, whereby upon axial compression of the sleeve the thinner wall sections will expand more rapidly and to a greater extent than the thicker wall sections so as to provide a series of bulges at the outer surface of the sleeve which will effect gripping of the records. It will be noted that the sleeve 38 is sufficiently expanded radially in the position shown in FIGURE 2 to support the records, and yet the rod 34 has not yet reached the lower end of its vertical stroke. As the rod 34 moves to its lowermost position as shown in FIGURE 3 the gaps left by the partially closed inner grooves 78 are closed more completely. The internal annular grooves 78 offer the advantage of accelerating the gripping action of the sleeve 38, and also they provide an overtravel feature since the rod 34 may be moved a substantial distance downwardly after the sleeve has been expanded sufficiently to grip all but the lowermost record in the stack. It will further be noted that the tapered upper end 50 of the spindle body acts as a spreading member and thus assists in the expansion of the record gripping sleeve, particularly in the area of the next-to-lowermost record in a stack of records being supported on the fingers 32, which of course is the lowermost record in the stack which is supported by the sleeve.

The operation of the self-supporting spindle shown in FIGURES 1–3 will now be described. With the components positioned as shown in FIGURE 1, a stack of records R is lowered over the spindle so as to rest upon the upper ends of the primary supporting fingers 32. In order to drop a record down the spindle to a turntable for playing, the actuator rod 34 is first moved downwardly to the position of FIGURE 3, and then moved upwardly again to the normal position of FIGURE 1. When the rod 34 is moved downwardly to the position of FIGURE 3, the cap 36 at the upper end thereof compresses the rubber sleeve 38 axially and causes it to expand radially to grip all but the lowermost one of the stack of records. The downward movement of the rod 34 also carries with it the primary supporting fingers 32, and as the cam surfaces 70 on the fingers engage the upper edge of the spindle collar 39, the fingers are cammed inwardly to their retracted positions so as to release the lowermost record, while the remainder of the stack is supported by the secondary supporting member or sleeve 38.

As the fingers 32 move downwardly, the cam portions 66 at the lower ends thereof engage the spring arms 64 of the stop ring 37 and expand such arms radially outwardly to the positions shown in FIGURE 3, whereby the record which is released by the fingers 32 is stopped and supported on the upper ends of the arms 64. While the bottom record is thus supported in a lowered intermediate position on the arms 64, the tone arm (not shown) or other suitable size-sensing means may be moved into engagement with the edge of the record to sense the size thereof (for the purpose of determining the proper set down position of the tone arm after the record has been dropped to the turntable). Mechanism for sensing the size of a record and positioning the tone arm in accordance therewith is not described herein since such mechanism is well known to those skilled in the art and does not form a part of the present invention.

Once the bottom record R has been dropped to the support arms 64 and the size thereof has been sensed, the actuator rod 34 is moved upwardly to its original position as shown in FIGURE 1. When the rod 34 is moved upwardly the fingers 32 are again extended radially outwardly through the slots 48 in the spindle body 30, the fingers being urged outwardly due to engagement at the lower ends thereof by the inwardly biased spring arms 64 which return to their radially retracted positions and permit the record supported thereon to be dropped to the turntable for playing. As the rod 34 moves upwardly beyond the position shown in FIGURE 2, the rubber sleeve 38 retracts radially and permits the remaining stack of records to drop to the supporting fingers 32.

FIGURES 12–18 illustrate an alternative embodiment of the invention, and in those instances where components are substantially identical to those of the embodiment of FIGURES 1–3, corresponding primed numerals are used. FIGURE 16 shows an extruded piece of aluminum tubing T' before being machined, and FIGURE 17 shows a spindle body 82 formed by performing a turning operation on the tubing T'. In the turning operation, a portion of the external wall of the tubing is removed to expose a plurality of upper slots 48' to accommodate a plurality of primary supporting fingers 32', the latter being caged between a plurality of ribs 42' in the manner described earlier herein. The upper end of the spindle body 82 is machined to form a tapered portion 50'. A portion of the outer wall is left at 84 to define the upper ends of the slots 48', and a second wall portion 86 defines the lower ends of such slots. A groove is formed in the spindle body at 88, and beneath the groove a spindle wall portion is indicated at 90. In the formation of the groove 88, openings 92 are exposed between the rib members 42'.

As shown in FIGURE 12, a sponge ring 94 made of flexible esterurethane foam or other suitable spongy material is mounted on the section 74' of the actuator rod 34' so as to bear against the radially inner portions of the upper ends of the primary supporting fingers 32' and thereby urge the latter toward their radially extended positions. When the actuator rod 34' is pulled downwardly to the position shown in FIGURE 14, the fingers 32' will be retracted and will compress the sponge ring 94 so as to release the lowermost record in the stack in the manner previously described.

In order to stop a record which is released by the fingers 32' and support the same in an intermediate size-sensing position, a rubber stop ring 96 is mounted in the groove 88 formed in the spindle body 82. The depth of the groove 88 is approximately the same as the thickness of the stop ring 96 so that when the actuator rod 34' is in its uppermost position, as shown in FIGURE 12, the ring will be flush with or slightly recessed relative to the outer wall portions 86 and 90 of the spindle body 82. When the rod 34' is moved to its downward position as shown in FIGURE 14, the cam surfaces 66' on the lower ends of the fingers 32' will engage the stop ring 96 and expand the same radially outwardly of the spindle wall, whereby the record which is released by the fingers 32' will be stopped and supported on the stop ring to permit sensing the size thereof. As soon as the rod 34' is again moved upwardly, the ring 96 will contract so as to release the record supported thereon and drop the same to the turntable for playing. It will now be understood that in the embodiment of FIGURES 1–3 the stop ring 37 performs the dual function of biasing the fingers 32 outwardly and also supporting a record in an intermediate position, whereas in the embodiment of FIGURES 12–14 the sponge ring 94 biases the fingers 32' outwardly, while the stop ring 96 supports the records one at a time in a lowered intermediate position.

While I have described my invention in certain preferred forms I do not intend to be limited to such forms, except insofar as the appended claims are so limited, since modifications coming within the scope of my invention will readily occur to others with my disclosure before them.

I claim:

1. For use in a self-supporting record changer center spindle of the type having a plurality of circumferentially spaced record supporting fingers disposed within a hollow spindle body and movable between first operative positions wherein they project through slots formed in the wall of the spindle body and extend radially outwardly of said body to support a stack of records thereon and second inoperative positions wherein they are substantially retracted within the spindle body, the improvement comprising a spindle body including a thin-walled tubular member, a plurality of solid internal longitudinal ribs formed integral with said tubular member, said ribs extending substantially the length of said tubular member and disposed in circumferentially spaced relation to define spaces therebetween, said spaces being adapted to accommodate respective record supporting fingers therein such that each supporting finger has substantially its entire length positioned within a space defined by two adjacent longitudinal ribs, and a plurality of circumferentially spaced vertical slots formed in said tubular member, said slots being formed intermediate said internal ribs so as to communicate with the spaces between said ribs.

2. For use in a self-supporting record changer center spindle of the type having a plurality of circumferentially spaced record supporting fingers disposed within a hollow spindle body and movable between first operative positions wherein they project through slots formed in the wall of the spindle body and extend radially outwardly of said body to support a stack of records thereon and second inoperative positions wherein they are substantially retracted within the spindle body, the improvement comprising a spindle body including a thin-walled tubular member, a plurality of solid internal longitudinal ribs formed integral with said tubular member and extending substantially the length thereof, said ribs being disposed in circumferentially spaced relation to define spaces therebetween adapted to accommodate respective record supporting fingers therein such that each supporting finger has substantially its entire length positioned within a space defined by two adjacent longitudinal ribs, said internal ribs each being approximately triangular in horizontal section and comprising a pair of longitudinal walls each of which is generally parallel to an oppositely disposed wall of an adjacent rib member whereby the spaces between said rib members are each defined by a pair of generally parallel rib walls, and a plurality of circumferentially spaced vertical slots formed in said tubular member, said slots being formed intermediate said internal ribs so as to communicate with the spaces between said ribs.

3. A method of making a spindle body for a self supporting record changer center spindle of the type having a plurality of circumferentially spaced record supporting fingers disposed within a hollow spindle body and movable between first operative positions wherein they project through slots formed in the wall of the spindle body and extend radially outwardly of said body to support a stack of records thereon and second inoperative positions wherein they are substantially retracted within the spindle body, which method comprises extruding a thin-walled tubular member having a plurality of circumferentially spaced integral internal longitudinal solid ribs extending the length of said tubular member and of substantially greater radial thickness than the intervening webs of said tubular member wall between said ribs, and performing a turning operation on said extruded tubular member to remove an axial circumferential portion of said thin wall to a depth greater than the thickness of said web and thereby expose portions of the spaces between said rib members to form a plurality of circumferentially spaced vertical slots in said spindle body having communication with said spaces between said ribs in which said record supporting fingers may be caged.

4. In a self-supporting center spindle for an automatic record changer, the improvement comprising, in combination, a spindle body comprising a length of tubing having a plurality of solid internal longitudinal rib members formed integral therewith and extending substantially the length of said tube, said ribs being disposed in circumferentially spaced relation to define spaces therebetween, a portion of the tubing wall being removed to expose the spaces between said rib members and thereby form a plurality of circumferentially spaced vertical slots in said spindle body, a plurality of record supporting fingers positioned within said spindle body and disposed in corresponding ones of said spaces between said internal rib members, each supporting finger having substantially its entire length positioned within a space defined by two adjacent rib members, said fingers being movable between first operative positions wherein a portion thereof project through said slots and radially outwardly of said spindle body so as to support a stack of records thereon and second inoperative positions wherein they are substantially retracted within said spindle body, and actuator means disposed within said spindle body and associated with said record supporting fingers for moving the same between said first and second positions.

5. In a self-supporting center spindle for an automatic record changer, the improvement comprising, in combination, a spindle body comprising a length of thin-walled extruded tubing having a plurality of solid internal longitudinal rib members formed integral therewith and extending the length of said tubing, said rib members being disposed in circumferentially spaced relation to define spaces therebetween, a portion of said thin wall being removed to expose the spaces between said rib members and thereby form a plurality of circumferentially spaced vertical slots in said spindle body, a plurality of record supporting fingers positioned withiin said spindle body and disposed in corresponding ones of said spaces between said internal rib members, each supporting finger having substantially its entire length positioned within a space defined by two adjacent rib members, said fingers being movable between first operative positions wherein they project through said slots and radially outwardly of said spindle body so as to support a stack of records thereon and second inoperative positions wherein they are substantially retracted within said spindle body, and actuator means disposed within said spindle body and associated with said record supporting fingers for moving the same between said first and second positions.

6. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall shorter than said rib members being removed to expose the spaces between said rib members and thereby form a plurality of circumferentially spaced vertical slots in said spindle body, a plurality of record supporting fingers slidably positioned within said spindle body and disposed in corresponding ones of said spaces between said internal rib members, said fingers being of a thickness slightly less than the spacing between said ribs whereby said ribs act as a cage to control the circumferential spacing of said fingers, said fingers being movable between first operative positions wherein they project through said slots and radially outwardly of said spindle body so as to support a stack of records thereon and second inoperative positions wherein they are substantially retracted within said spindle body, and actuator means disposed within said spindle body and associated with said record supporting fingers for moving the same between said first and second positions.

7. The invention of claim 6 wherein each of said internal rib members is approximately triangular in horizontal section and comprises a pair of longitudinal walls extending the length of said tubing each of which is generally parallel to an oppositely disposed wall of an adjacent rib member whereby the spaces between said rib members are each defined by a pair of generally parallel rib walls spaced apart slightly greater than the thickness of the corresponding record supporting fingers.

8. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween a portion of said thin wall less than the length of said rib members being removed to expose the spaces between said rib members and thereby form a plurality of circumferentially spaced vertical slots in said spindle body, a plurality of record supporting fingers slidably positioned within said spindle body and disposed in corresponding ones of said spaces between said internal rib members, said fingers being of a thickness slightly less than the spacing between said ribs whereby said ribs act as a cage to control the circumferential spacing of said fingers, and actuator means for moving said fingers between first operative positions wherein they project through said slots and radially outwardly of said spindle body so as to support a stack of records thereon and second inoperative positions wherein they are substantially retracted within said spindle body, said actuator means comprising a rod disposed within said spindle body and axially movable therein, said rod having a peripheral groove formed therein and said fingers each having a radially inwardly directed extension which projects into said groove whereby when said rod is moved axially within said spindle body it will carry said fingers therewith to move the latter between said first and second positions.

9. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall being removed to expose the spaces between said rib members and thereby form a plurality of circumferentially spaced vertical slots in said spindle body, a plurality of outwardly biased record supporting fingers positioned within said spindle body and disposed in corresponding ones of said spaces between said internal rib members, an annular collar mounted on said spindle body where said wall portion has been removed so as to encompass said ribs and being manually slidable axially thereon between a normal lower position and a raised position, and actuator means axially movable within said spindle body and associated with said supporting fingers whereby when said actuator is moved upwardly said fingers will project through said slots and radially outwardly of said spindle body so as to support a stack of records thereon and when said actuator is moved downwardly said fingers will engage said collar and be cammed inwardly to substantially retracted positions, said collar being manually slidable upwardly on said spindle to retract said fingers when said actuator means is in its upper position to thereby adapt said spindle for manual play.

10. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall being removed to expose the spaces between said rib members and thereby form a plurality of circumferentially spaced vertical slots in said spindle body, primary record supporting means including a plurality of outwardly biased record supporting fingers positioned within said spindle body and disposed in corresponding ones of said spaces between said internal rib members, secondary supporting means comprising a resilient sleeve mounted at the upper end of said spindle body and expandable radially to grip all but the lowermost one of a stack of records supported on said fingers, an annular collar mounted on said spindle body where said wall portion has been removed so as to encompass said ribs and being manually slidable axially thereon between a normal lower position and a raised position, and an actuator rod associated at its upper end with said sleeve and also associated with said primary supporting fingers, said actuator rod being axially movable within said spindle body whereby when said actuator is moved upwardly said sleeve will be retracted to a normal inoperative position and said fingers will project through said slots and radially outwardly of said spindle body so as to support a stack of records thereon and when said actuator is moved downwardly said sleeve will be expanded radially to an operative record gripping position and said fingers will engage said collar and be cammed inwardly to substantially retracted positions, said collar being manually slidable upwardly on said spindle to retract said fingers when said actuator rod is in its upper position to thereby adapt said spindle for manual play.

11. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall being removed to expose the spaces between said rib members and thereby form a plurality of circumferentially spaced vertical slots in said spindle body, primary record supporting means including a plurality of outwardly biased record supporting fingers positioned within said spindle body and disposed in corresponding ones of said spaces between said internal rib members, secondary supporting means comprising a resilient sleeve mounted adjacent the upper end of said spindle body and expandable radially to grip all but the lowermost one of a stack of records supported on said fingers, an actuator rod associated at its upper end with said sleeve and also associated with said primary supporting fingers, said actuator rod being axially movable within said spindle body whereby when said actuator is moved upwardly said sleeve will be retracted to a normal inoperative position and said fingers will project through said slots and radially outwardly of said spindle body so as to support a stack of records thereon and when said actuator is moved downwardly it will axially compress and thereby radially expand said sleeve to an operative record gripping position and will carry said fingers downwardly to cam the same inwardly to substantially retracted positions, and a fixed frusto-conical spreading member seated in a frusto-conical recess at the lower end of said sleeve so as to support said sleeve and assist in the radial expansion thereof when said actuator rod is moved downwardly.

12. The invention of claim 11 wherein the upper end of said spindle body is tapered so as to comprise said frusto-conical spreading member which is thus integral with the spindle body.

13. In a self-supporting center spindle for an automatic record changer which spindle is of the type comprising primary record supporting means for supporting a stack of records and releasing them one at a time to a turntable and secondary record supporting means for supporting all but the lowermost record in a stack of records supported on the primary supporting means, the improvement comprising, in combination, a spindle body, an actuator rod axially movable within said spindle body and projecting above the upper end thereof, a cap carried on the upper end of said actuator rod, and secondary supporting means comprising a resilient sleeve mounted on said actuator rod between said cap and the upper end of said spindle body whereby when said actuator is pulled downwardly said sleeve will be axially compressed and thereby radially expanded to an operative record gripping position, said sleeve having a plurality of internal annular grooves formed therein to accelerate the radial expansion thereof.

14. The invention of claim 13 wherein the upper end of said spindle body comprises a frusto-conical spreading member which is seated in a frusto-conical recess formed in the bottom of said sleeve to assist in the radial expansion of said sleeve when said actuator rod is pulled downwardly.

15. In a self-supporting center spindle for an automatic record changer, the improvement comprising, in combination, a hollow spindle body having a plurality of circumferentially spaced vertical slots formed in the wall thereof, an actuator rod movable axially within said spindle body, a plurality of record supporting fingers disposed within said spindle body and associated with said actuator rod for axial movement therewith, and a sponge ring mounted on said actuator rod inwardly of the upper ends of said supporting fingers so as to bias the latter radially outwardly whereby when said actuator rod is moved upwardly said sponge ring will urge said supporting fingers to operative positions wherein they project through said slots and radially outwardly of said spindle body to support a stack of records thereon and when said actuator rod is moved downwardly said fingers will engage the lower ends of said slots and be cammed radially inwardly to substantially retracted inoperative positions thus compressing said sponge ring.

16. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall being removed to expose the spaces between said rib members and thereby form a plurality of circumferentially spaced vertical slots in said spindle body, an actuator rod movable axially within said spindle body, a plurality of record supporting fingers positioned within said spindle body and disposed in corresponding ones of said spaces between said internal rib members, said fingers being associated with said actuator rod for axial movement therewith, and a sponge ring mounted on said actuator rod inwardly of the upper ends of said supporting fingers so as to bias the latter radially outwardly whereby when said actuator rod is moved upwardly said sponge ring will urge said supporting fingers to operative positions wherein they project through said slots and radially outwardly of said spindle body to support a stack of records thereon and when said actuator rod is moved downwardly said fingers will engage the lower ends of said slots and be cammed radially inwardly to substantially retracted inoperative positions thus compressing said sponge ring.

17. In a self-supporting center spindle for an automatic record changer, the improvement comprising, in combination, a spindle body comprising a length of thin-walled extruded tubing having a plurality of internal longitudinal rib members formed integral therewith and disposed in circumferentially spaced relation to define spaces therebetween, a portion of said thin wall being removed to expose the spaces between said rib members and thereby form a plurality of circumferentially spaced vertical slots in said spindle body, an actuator rod movable axially within said spindle body, a plurality of outwardly biased record supporting fingers positioned within said spindle body and disposed in corresponding ones of said spaces between said internal rib members, said fingers being associated with said actuator for axial movement therewith whereby when said actuator rod is moved upwardly said fingers will be moved to operative positions wherein they project through said slots and radially outwardly of said spindle body to support a stack of records thereon and when said actuator rod is moved downwardly said fingers will be carried downwardly and will engage the lower ends of said slots and be cammed radially inwardly to substantially retracted inoperative positions, said fingers each having an inclined cam surface formed at the lower radially outer portion thereof which surface extends downwardly and toward the axis of said spindle body, and radially expandable record stop means mounted on said spindle body to encompass the same at a section where a second portion of said thin wall has been removed, said stop means being positioned to be engaged and radially expanded by said cam surfaces when said fingers are carried downwardly whereby said stop means will be expanded to an operative record supporting position upon the downward movement of said actuator rod.

18. The invention of claim 17 wherein said record stop means comprises a resilient expandable ring mounted in an annular groove formed in said spindle body whereby when said ring is in its normal retracted position a record on said spindle body may move downwardly therepast and when said fingers are carried downwardly said cam surfaces will engage said resilient ring and thereby expand the same radially outwardly of the spindle wall to an operative record supporting position.

19. The invention of claim 17 wherein said record stop means comprises a ring having a plurality of upwardly projecting curved spring arms, said spring arms being biased radially inwardly into continuous engagement with said cam surfaces to urge said record supporting fingers to their radially outer positions, and said spring arms being thereby actuated to radially extended operative record supporting positions by said cam surfaces upon the downward movement of said actuator rod.

References Cited by the Examiner

UNITED STATES PATENTS

| | | | |
|---|---|---|---|
| 2,617,655 | 11/1952 | Leonard | 274—10 |
| 3,083,022 | 3/1963 | Hansen | 274—10 |

FOREIGN PATENTS

| | | |
|---|---|---|
| 822,026 | 9/1937 | France. |
| 766,071 | 1/1957 | Great Britain. |

OTHER REFERENCES

German application 1,034,383, July 1958.

JOHN M. HORAN, *Primary Examiner.*

NORTON ANSHER, *Examiner.*

CLIFFORD B. PRICE, *Assistant Examiner.*